United States Patent [19]

Hirst

[11] Patent Number: 5,446,812
[45] Date of Patent: Aug. 29, 1995

[54] IMPROVING SIGNAL TO NOISE RATIO IN AN OPTICAL TRANSMISSION SYSTEM

[75] Inventor: Ian J. Hirst, Kent, United Kingdom

[73] Assignee: Northern Telecom Limited, Montreal, Canada

[21] Appl. No.: 152,280

[22] Filed: Nov. 12, 1993

[30] Foreign Application Priority Data

Nov. 17, 1992 [GB] United Kingdom ................ 9224215

[51] Int. Cl.⁶ .............................................. G02B 6/00
[52] U.S. Cl. ..................................................... 385/24
[58] Field of Search ..................................... 385/20–32; 372/1–4, 6, 20, 28, 32; 359/110, 161, 349, 194, 127, 333; 356/351, 73.1, 345; 455/67.1, 235.1, 249.1, 617–619

[56] References Cited

U.S. PATENT DOCUMENTS

| | | | |
|---|---|---|---|
| 4,947,134 | 8/1990 | Olsson | 330/4.3 |
| 4,947,459 | 8/1990 | Nelson et al. | 455/1612 |
| 5,225,922 | 7/1993 | Chraplyvy et al. | 359/124 |

Primary Examiner—Akm E. Ullah
Attorney, Agent, or Firm—Lee, Mann, Smith, McWilliams, Sweeney & Ohlson

[57] ABSTRACT

An optical transmission system comprises a concatenated chain of amplifiers disposed along a fiber transmission path. The signal to noise ratio is measured at each amplifier by selectively notch filtering a transmitted signal and measuring the power of the filtered and unfiltered signal within the notch bandwidth. A supervisory system controls the gain of each system amplifier whereby to maximize the aggregate signal to noise ratio of the system.

2 Claims, 3 Drawing Sheets

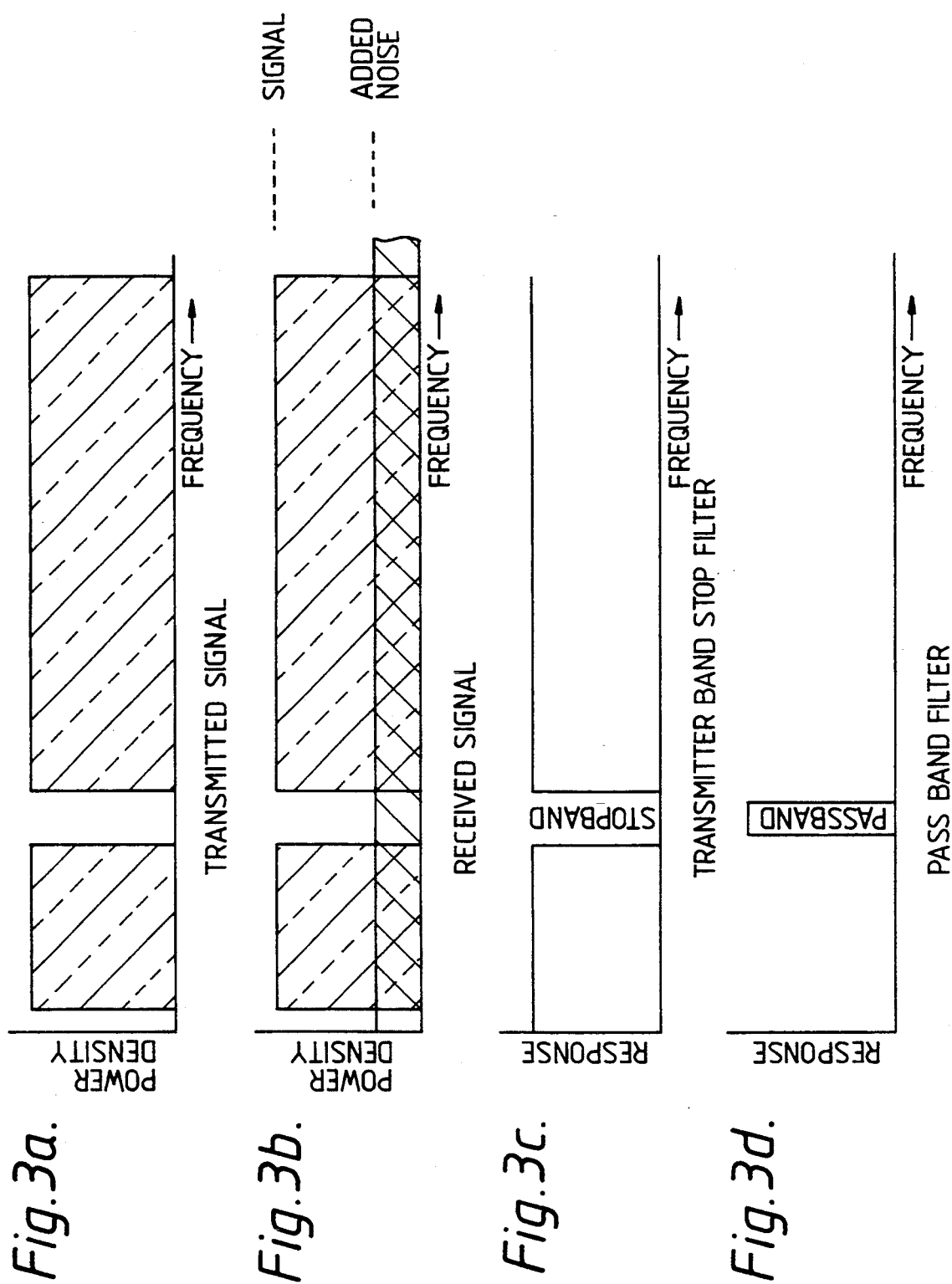

IMPROVING SIGNAL TO NOISE RATIO IN AN OPTICAL TRANSMISSION SYSTEM

This invention relates to optical e.g. submarine communications systems, and in particular to equipment for noise measurement in such systems. The invention further relates to systems incorporating the noise measurement equipment and to a method of controlling such a system.

Optically amplified transmission systems have recently been introduced to short and medium haul applications. Unlike a conventional 3 R repeater which reshapes and retimes signals an optical amplifier provides single analogue amplification of all input optical signals. It will be appreciated that in such an arrangement each amplifier will amplify not only the wanted signal but also any noise appearing at its input, and will also add its own spontaneous noise to the amplified signal. In such a system, noise can arise from a number of sources. In addition to the above-mentioned spontaneous noise from the amplifier, there is also the spontaneous noise generated by the transmitter and receiver, and intermodulation noise generated by non-linearity of the optical fibre. Further noise may be generated by system faults. At the receiving end of the system this accumulated noise sets a limit on the maximum rate that may be achieved with an acceptable bit/error ratio (BER) performance.

In order to maintain system performance it is necessary to provide continuous measurement of the signal-to-noise ratio so that noise generating system faults and/or long term degradation of the system components can be identified to allow appropriate remedial action. Conventionally, in a digital repeatered system the signal-to-noise ratio is measured by equipment located at the receiver end of the system. This technique is not entirely satisfactory when applied to optically amplified systems as it is not always possible to identify a particular noise source arising from a system fault. This makes any remedial action a very difficult process and provides insufficient information for efficient supervisory control of the system.

The object of the invention is to minimise or to overcome this disadvantage.

According to the invention there is provided a method of signal/noise ratio measurement in an amplifier of an optically amplified transmission system, the method including selectively notch filtering a transmitted signal, and measuring at each said amplifier the signal power within the bandwidth of said notch for both the filtered and unfiltered signal whereby to obtain a measure of the signal to noise ratio of that amplifier.

The signal/noise ratio measurement is performed at each optical amplifier, the process being controlled over the supervisory system.

According to the invention there is further provided a method of controlling an optical transmission system comprising a plurality of concatenated optical amplifiers and an optical transmission path therebetween, the method including selectively notch filtering a signal transmitted from one end of the path, measuring at each said amplifier the signal power within the bandwidth of said notch for both the filtered and unfiltered signal whereby to obtain from each said amplifier a measure of its signal to noise ratio, and selectively controlling the gain of each said amplifier to a value corresponding to its signal to noise ratio whereby to maximise the aggregate signal to noise ratio of the transmission system.

According to another aspect of the invention there is provided an optical transmission system comprising a plurality of concatenated optical amplifiers, an optical transmission path therebetween, a transmitter disposed at one end of the system, a receiver disposed at the other end of the system, means for measurement of the signal to noise ratio of each system amplifier, and supervisory means responsive to said signal to noise ratio measurement for selectively controlling the gain of each said amplifier whereby to maximise the aggregate signal to noise ratio of the system.

An embodiment of the invention will now be described with reference to the accompanying drawings in which.

Figure 1:
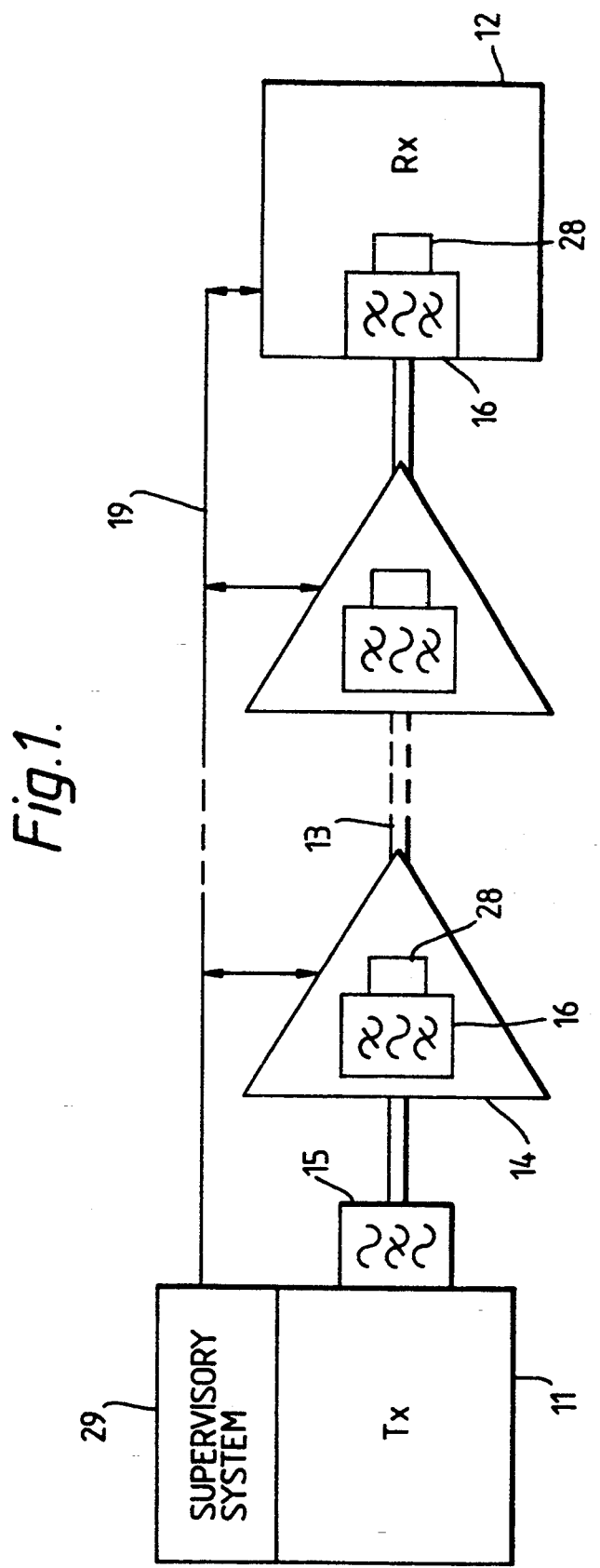
FIG. 1 is a schematic diagram of an optically amplified transmission system.

FIGS. 3a to 3d together illustrate a spectral analysis of the transmitted and received signals of the system of FIG. 1.

Referring to FIG. 1, the system includes a transmitter 11 and a receiver 12 coupled via an optical transmission path 13. Periodic amplification of signals transmitted along the path 13 is effected by a series of optical amplifiers 14. The amplification process is analogue in nature and thus both the wanted signal and the unwanted noise are amplified together. The system may comprise either a land-based or a submarine system.

At the transmitter end of the system a notch filter 15 may be switched into and out of the transmission path. The amplifier 14 and the receiver 11 are provided each with a respective bandpass filter 16 whose passband corresponds to the extinction band of the notch filter 15. The bandpass filters 16 each form part of a respective optical noise measurement circuit 28 associated with that amplifier.

The supervisory system controls each system amplifier responsive to signals received back over the supervisory channel from each amplifier. In particular the supervisory system 29 provides selective control of the gain of each amplifier.

Figure 2:
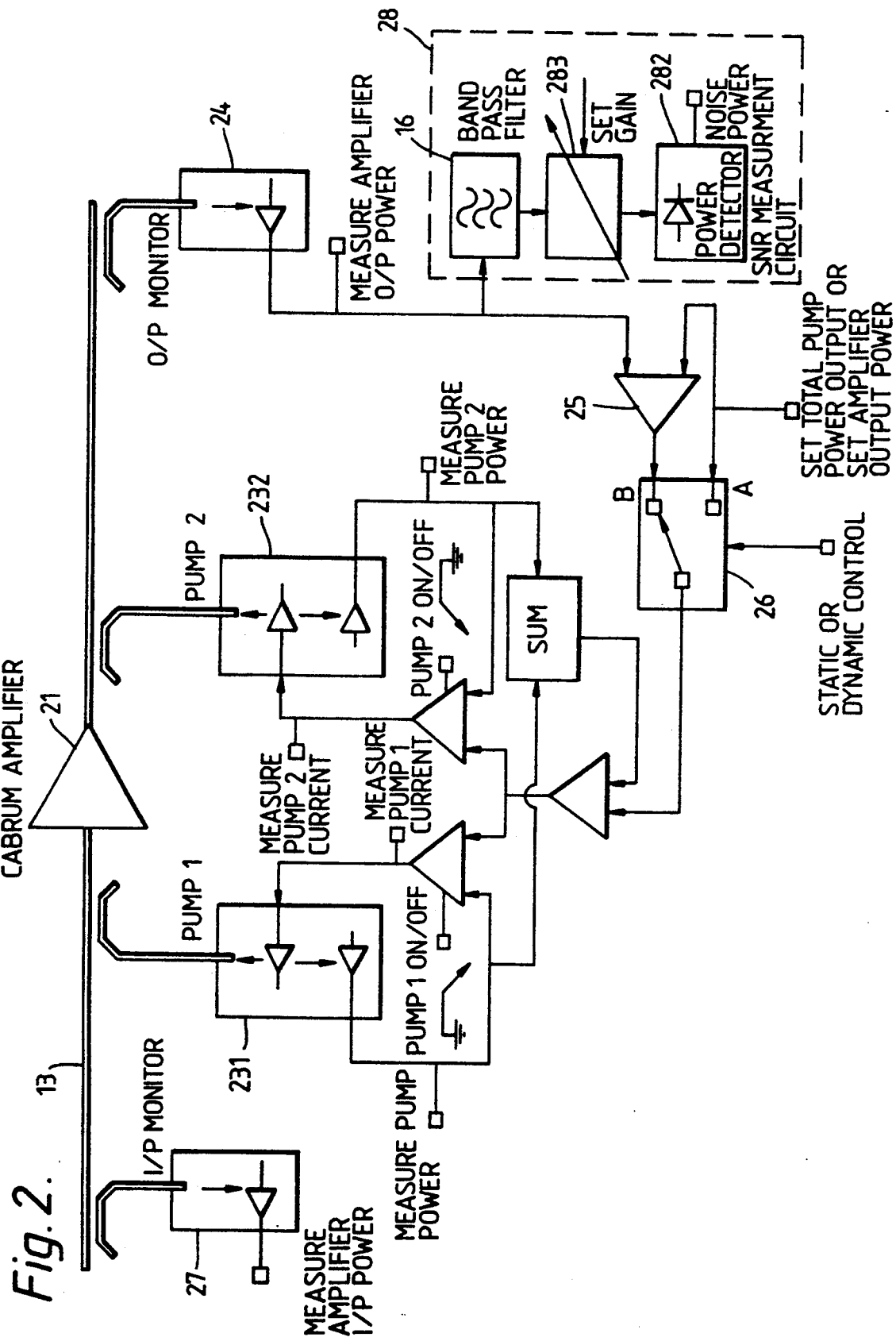
FIG. 2 shows an amplifier construction for use in the system of FIG. 1.

A system amplifier construction is shown in more detail in FIG. 2. Light (including noise) signals transmitted along the fibre path 13 are amplified by amplifier 21. This may comprise a section of amplifying erbium fibre which is forward pumped by a first laser 231 and backward pumped by a second laser 232. The gain of the amplifier is determined via an output photodiode monitor 24 which provides a feedback signal to the pump laser drive circuit 24 via a two-input amplifier 25 and a two-way switch 26. Optionally an input monitor 27 may be provided to measure the optical power at the input of the amplifier.

The output monitor 24 is also coupled to the measurement circuit 28 whereby the signal/noise ratio at the output of the amplifier 21 is determined. The circuit 28 incorporates a bandpass filter 16 whose output feeds a power measurement circuit 282 via a gain adjustment circuit 283. The passband of the filter 281 is within the extinction band of the notch filter provided at the transmitter.

Measurement of the signal/noise ratio in the system of FIG. 1 will now be described with reference to FIGS. 3a to 3d. This measurement may be effected over the supervisory channel of the system. With the notch filter in circuit the signal power inside the notch bandwidth is measured. FIG. 3a illustrates the filtered transmitter output and FIG. 3b illustrates the transmitted signal together with accumulated noise. FIG. 3c illustrates the measurement circuit response at a system amplifier or at the receiver end of the system. The measurement circuit is tuned to the notch centre and has a bandwidth that is narrower than that of the notch as illustrated in FIG. 3d. Thus, the power measured within the notch arises solely from the system noise. The notch filter is then removed and a new measurement is made of the power within the measurement circuit bandwidth. This represents the transmitted signal. The signal/noise ratio of frequencies within the notch bandwidth is then obtained from the ratio of the two measurements.

The results of this signal/noise measurement may be utilised in the supervisory control of the system. In particular the gain of each system amplifier may be adapted correspondingly to its signal/noise ratio whereby to optimise the overall transmission quality. I.e, a relatively noisy amplifier may be provided with a low gain and a relatively noise-free amplifier may be provided with a high gain thereby maximising the signal/noise ratio of the transmission system. The gain control is effected over the supervisory system as shown in FIG. 1.

The transmission system may comprise a wholly amplified system or it may comprise a hybrid system having a number of repeaters or regenerators each of which is linked to the next via a concatenated chain of optical amplifiers. Such an arrangement is described in our co-pending UK application No. 92 13696.9 (M Chown 40-14-14).

In a hybrid system, the digital regenrators provide clean-up and retiming of signals at relatively widely spaced intervals along the signal path. Amplification of signals between regenrators is provided by the concatenated chain of amplifiers therebetween, this amplification being substantially linear. Each optically amplified section of the system may be treated as a separate transmission path whose individual amplifiers are each provided with gain control to obtain the optimum transmission characteristics.

It will be appreciated that all amplifier systems are suitable for short and medium band applications whereas a hybrid system may be more appropriate for long haul, e.g. transoceanic applications.

I claim:

1. A method of controlling optical transmission of signals along a signal path comprising a transmitter, a receiver and a guided optical transmission path incorporating a plurality of concatenated optical amplifiers therebetween, the method consisting of, selectively notch filtering filter a signal transmitted on to the path from the transmitter;

bandpass filtering the transmitted signal at each amplifier and at the receiver so as to select signals within said notch, said selected signals corresponding to noise in the transmitted signal;

measuring the power of the selected signals;

comparing at each said amplifier and at the receiver the measured power of the selected signals with measurements on a transmitted signal to which said notch filtering has not been applied so as to determine a measure of the signal to noise ratio of the signals received by that amplifier or by the receiver;

generating, in response to each said signal to noise determination, a feedback control signal from each said amplifier and from the receiver;

transmitting each said feedback control signal over a supervisory channel to the immediately previous concatenated amplifier;

and controlling the gain of each said amplifier in response to the respective feedback control signal so as to enhance the gain of relatively noise free amplifiers and reduce the gain of relatively noisy amplifiers whereby to maximise the signal to noise ratio of the system.

2. A method as claimed in claim 1, wherein said plurality of concatenated optical amplifiers form part of a hybrid system comprising optical amplifier and digital repeaters or regenerators.

* * * * *